United States Patent
Viaux et al.

(10) Patent No.: US 10,676,138 B2
(45) Date of Patent: Jun. 9, 2020

(54) VEHICLE UNDERBODY STRUCTURE COMPRISING A REINFORCEMENT ELEMENT BETWEEN A LONGITUDINAL BEAM AND A LOWERSIDE SILL PART

(71) Applicant: ArcelorMittal, Luxembourg (LU)

(72) Inventors: Ivan Viaux, Paris (FR); Florin Arnautu, Beauvais (FR)

(73) Assignee: ARCELORMITTAL, Luxembourg (LU)

( * ) Notice: Subject to any disclaimer, the term of this patent is extended or adjusted under 35 U.S.C. 154(b) by 6 days.

(21) Appl. No.: 15/780,079

(22) PCT Filed: Dec. 9, 2016

(86) PCT No.: PCT/EP2016/002076
§ 371 (c)(1),
(2) Date: May 30, 2018

(87) PCT Pub. No.: WO2017/097424
PCT Pub. Date: Jun. 15, 2017

(65) Prior Publication Data
US 2019/0217902 A1    Jul. 18, 2019

(30) Foreign Application Priority Data
Dec. 9, 2015  (WO) .................. PCT/IB2015/059478

(51) Int. Cl.
*B62D 25/20* (2006.01)
*B62D 29/00* (2006.01)
(Continued)

(52) U.S. Cl.
CPC ......... *B62D 25/2036* (2013.01); *B62D 21/03* (2013.01); *B62D 27/02* (2013.01);
(Continued)

(58) Field of Classification Search
CPC .. B62D 21/15; B62D 21/152; B62D 25/2018; B62D 25/2036; B60R 19/34; B60R 2021/0023
(Continued)

(56) References Cited

U.S. PATENT DOCUMENTS

| 10,000,239 B2 * | 6/2018 | Tatsuwaki .............. B62D 21/11 |
| 2009/0146462 A1 | 6/2009 | Sato et al. |

(Continued)

FOREIGN PATENT DOCUMENTS

| EP | 2733051 A1 | 5/2014 |
| WO | 2015156052 A1 | 10/2015 |

OTHER PUBLICATIONS

Abstract for WO 2017006159A1 (Drillet et al. 2018/0202017A1) (Year: 2017).*

(Continued)

*Primary Examiner* — Hilary L Gutman
(74) *Attorney, Agent, or Firm* — Davidson, Davidson & Kappel, LLC

(57) ABSTRACT

A vehicle underbody structure containing a floor panel, at least one longitudinal beam extending in a longitudinal direction of the vehicle under said floor panel and at least one lowerside sill part extending in the longitudinal direction adjacent to the floor panel, and at least one reinforcement element extending in a transversal direction, substantially perpendicular to the longitudinal direction, said reinforcement element made of a press hardened steel part having a tensile strength higher or equal to 1200 MPa and extending under the floor panel and being attached at one of its transversal ends to the longitudinal beam and at the other of its transversal ends to the lowerside sill part is provided. A vehicle body including the vehicle underbody structure is also provided.

12 Claims, 5 Drawing Sheets

(51) Int. Cl.
| | |
|---|---|
| *B62D 21/03* | (2006.01) |
| *B62D 27/02* | (2006.01) |
| *C22C 38/00* | (2006.01) |
| *C22C 38/02* | (2006.01) |
| *C22C 38/06* | (2006.01) |
| *C22C 38/32* | (2006.01) |
| *C22C 38/48* | (2006.01) |
| *C22C 38/50* | (2006.01) |
| *C22C 38/58* | (2006.01) |
| *C21D 1/18* | (2006.01) |

(52) U.S. Cl.
CPC .......... *B62D 29/007* (2013.01); *C22C 38/001* (2013.01); *C22C 38/002* (2013.01); *C22C 38/02* (2013.01); *C22C 38/06* (2013.01); *C22C 38/32* (2013.01); *C22C 38/48* (2013.01); *C22C 38/50* (2013.01); *C22C 38/58* (2013.01); *C21D 1/18* (2013.01); *C21D 2211/008* (2013.01)

(58) Field of Classification Search
USPC .............. 296/187.1, 187.09, 187.08, 193.09, 296/203.02, 184.1, 204
See application file for complete search history.

(56) References Cited

U.S. PATENT DOCUMENTS

| | | | | |
|---|---|---|---|---|
| 2009/0320968 | A1* | 12/2009 | Boeke | C21D 1/185 148/546 |
| 2011/0132502 | A1* | 6/2011 | Bian | C21D 1/185 148/534 |
| 2011/0315281 | A1* | 12/2011 | Charest | B62D 1/195 148/567 |
| 2012/0006089 | A1* | 1/2012 | Pohl | C21D 1/673 72/364 |
| 2013/0136945 | A1* | 5/2013 | Charest | B21D 22/022 428/610 |
| 2014/0152053 | A1 | 5/2014 | Watanabe et al. | |
| 2016/0145731 | A1* | 5/2016 | Sachdev | C23C 2/28 148/533 |
| 2017/0247071 | A1* | 8/2017 | Schneider | B62D 25/02 |
| 2018/0202017 | A1* | 7/2018 | Drillet | B32B 15/012 |

OTHER PUBLICATIONS

International Search Report issued in connection with International Application No. PCT/IB2015/059478 dated Aug. 31, 2016.
International Preliminary Report on Patentability issued in connection with International Application No. PCT/EP2016/002076 dated Mar. 16, 2016.
International Search Report issued in connection with International Application No. PCT/EP2016/002076 dated Jun. 13, 2017.

* cited by examiner

_US 10,676,138 B2_

VEHICLE UNDERBODY STRUCTURE COMPRISING A REINFORCEMENT ELEMENT BETWEEN A LONGITUDINAL BEAM AND A LOWERSIDE SILL PART

FIELD OF THE INVENTION

The present invention relates to a vehicle underbody structure, comprising a floor panel, at least one longitudinal beam extending in a longitudinal direction of the vehicle under said floor panel, and at least one lowerside sill part extending in the longitudinal direction adjacent to the floor panel, the vehicle underbody structure further comprising at least one reinforcement element extending in a transversal direction, substantially perpendicular to the longitudinal direction, said reinforcement element extending under the floor panel and being attached at one of its transversal ends to the longitudinal beam and at the other of its transversal ends to the lowerside sill part.

The present invention also relates to a vehicle body comprising such an underbody structure.

BACKGROUND OF THE INVENTION

Conventionally, the underbody structure of a vehicle forming the floor of the vehicle is arranged to protect the vehicle occupants in case of an impact, in particular a side impact or a front impact by limiting intrusions of any kind in the vehicle passenger compartment.

To this end, the underbody structure comprises reinforcement elements arranged transversally between structural longitudinal elements, such as underfloor longitudinal beams. This assembly is arranged to prevent the deformation of the vehicle compartment and to maintain the integrity of the floor panel in case of an impact, thereby protecting the occupants of the vehicle.

While this arrangement can be efficient in case of a side impact, i.e. an impact occurring in the transversal direction, and in case of a full front impact, i.e. an impact occurring in the longitudinal direction at the front or rear of the vehicle, a risk remains in the case of a front impact offset relative to the center of the vehicle, called "small overlap crash", regulated by the United States of America's Insurance Institute for Highway Safety. During such a small overlap crash, the impact occurs in the longitudinal direction at the front of the vehicle outboard of the longitudinal structural elements, i.e. on 25% or less frontal overlap of the vehicle. In this case, the regular impact absorbing elements provided at the front of the vehicle do not fully fulfill their function since the impact does not occur in front of the longitudinal beams of the vehicle.

In this case, as shown in FIGS. 5 and 6 representing respectively a view from below and a view from above of part of a conventional vehicle underbody structure after a small overlap crash, the wheel of the vehicle located on the same side as the impact barrier, tends to rotate towards the interior of the vehicle and to deform the floor panel at a location where the feet of an occupant of the vehicle are usually placed. Consequently, such an impact can cause significant damage to the occupant's legs.

BRIEF SUMMARY OF THE INVENTION

One of the objects of the invention is to improve the behavior of the vehicle underbody structure in case of a small overlap crash such that the floor panel sustains little deformation in case of such an impact.

The present invention provides a reinforcement element made of a press-hardened steel part having a tensile strength higher or equal to 1200 MPa.

By having a reinforcement element made of a press-hardened steel part having a tensile strength higher or equal to 1200 MPa located between the lowerside sill part and the longitudinal beam extending under the floor panel of the underbody structure, the transversal distance between the longitudinal beam and the lowerside sill part can be substantially maintained in case of a small overlap crash, which prevents or strongly reduces the deformation of the floor panel extending between the longitudinal beam and the lowerside sill part. Consequently, the feet of the occupants of the vehicle received in this space are preserved.

In additional embodiments, the vehicle underbody structure comprises one or more of the following features, considered alone or according to any technically possible combination:
  the reinforcement element has a martensitic microstructure and at least one of the longitudinal beams or lowerside sill parts has a structure which is not fully martensitic;
  both the longitudinal beam and lowerside sill part have a structure which is not fully martensitic;
  the reinforcement element comprises a first flank extending in a plane substantially parallel to the floor panel and a second flank extending in a plane perpendicular to the first flank, said first and second flanks both joining the longitudinal beam to the lowerside sill part;
  the second flank extends in a plane forming a non-zero angle with the longitudinal direction;
  the first flank has a substantially triangular shape, a first side of said triangular shape extending along the longitudinal beam, a second side of said triangular shape joining the longitudinal beam to the lowerside sill part and a third side of said trianglular shape extending along the second flank;
  the reinforcement element is attached to the lowerside sill part at a front longitudinal end of said lowerside sill part;
  the reinforcement element is welded to the longitudinal beam and to the lowerside sill part;
  the welding of the reinforcement element to the longitudinal beam and to the lowerside sill part is a resistance spot welding, an arc welding or a laser welding;
  the composition of the press hardened steel comprises in % weight:
  $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration; or
  $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration; or
  $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, the remainder being iron and unavoidable impurities resulting from the elaboration;
  the press hardened steel part is coated;
  the underbody structure further comprises a front pillar attached to the lowerside sill part and extending in an elevation direction substantially perpendicular to the longitudinal and transversal directions, said front pillar extending from a longitudinal front end of the lowerside sill part;

the underbody structure comprises a floor panel, a left longitudinal beam and a right longitudinal beam, both extending in the longitudinal direction under said floor panel, and a left lowerside sill part and a right lowerside sill part, extending in the longitudinal direction on either side of the floor panel, a left reinforcement element extending between the left longitudinal beam and the left lowerside sill part and a right reinforcement element extending between the right longitudinal beam and the right lowerside sill part, said left and right reinforcement elements being made of a press hardened steel part having a tensile strength higher or equal to 1200 MPa; and the underbody structure further comprises a transversal beam extending between the left longitudinal beam and the right longitudinal beam, said transversal beam extending along the same transversal axis as the left and right reinforcement elements; said transversal beam being made of a press hardened steel part having a tensile strength higher or equal to 1200 MPa.

The present invention also provides a vehicle body comprising a vehicle underbody structure as described above.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the term "longitudinal" refers to the rear-front direction and the term "transversal" refers to the left-right direction of an automotive vehicle in regular use condition. The terms "rear" and "front" are defined relative to the longitudinal direction and the terms "upper" and "lower" are defined relative to the elevation direction of an automotive vehicle in regular use condition.

Figure 1:
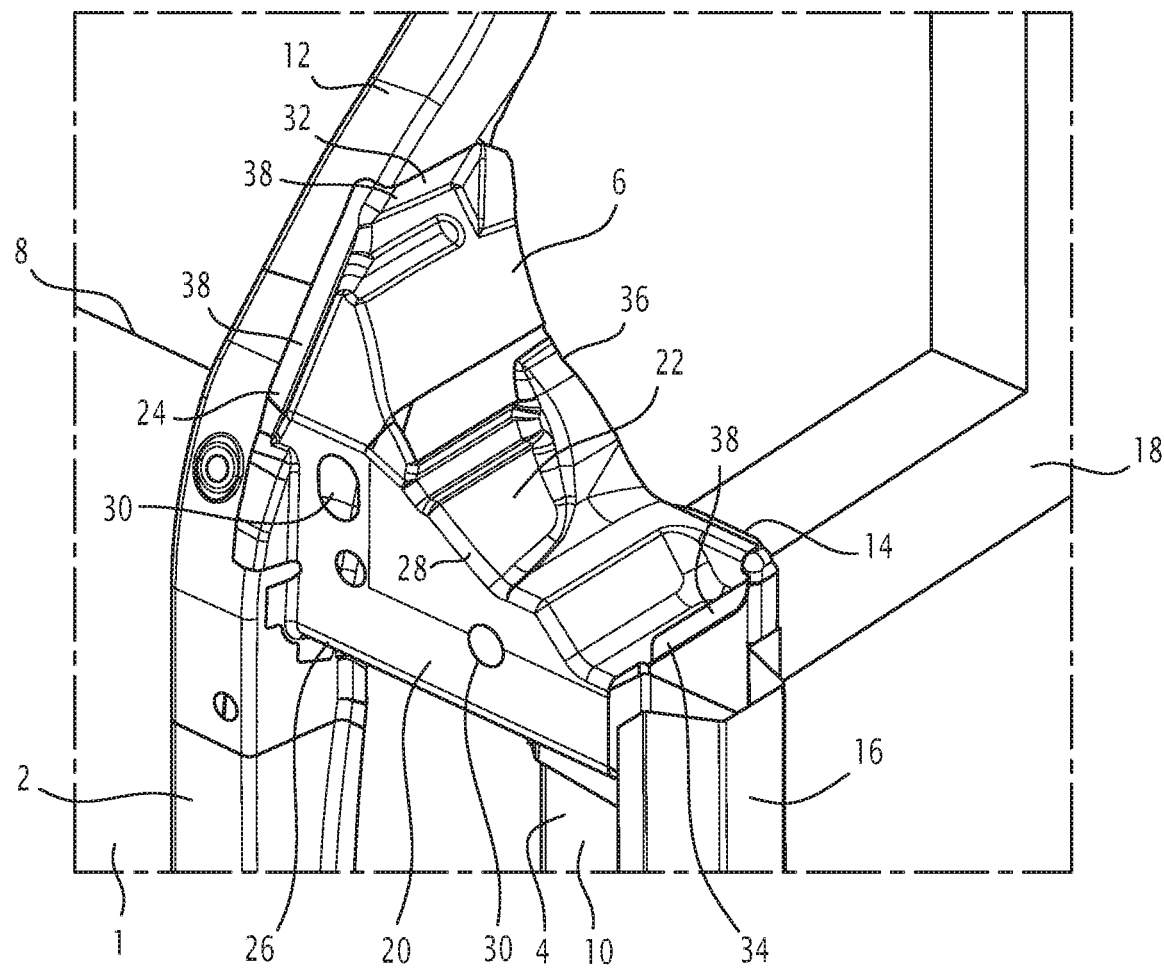
FIG. 1 is a perspective view from below of part of a vehicle underbody structure of the invention.

With reference to FIG. 1, there is described a vehicle underbody structure comprising a floor panel 1, at least one longitudinal beam 2, at least one lowerside sill part 4 and at least one reinforcement element 6.

The floor panel 1 extends generally along a horizontal plane in regular use condition of the vehicle and extends longitudinally between a front side 8 and a rear side and transversally between a left side 10 and a right side. In the figures, for the sake of simplicity, only the front side 8 and the left side 10 are visible.

The underbody structure is substantially symmetrical relative to a plane comprising the longitudinal and elevation direction and passing by the center of the floor panel between the left side 10 and the right side. Consequently, the following description will be made in detail for the left side only, the same teachings applying for the right side.

The floor panel 1 is intended to form the floor of the automotive vehicle and to serve as a base structure for the seats and the other elements of the passenger compartments. Spaces are also provided to receive the feet of the passengers of the vehicle.

Figure 2:
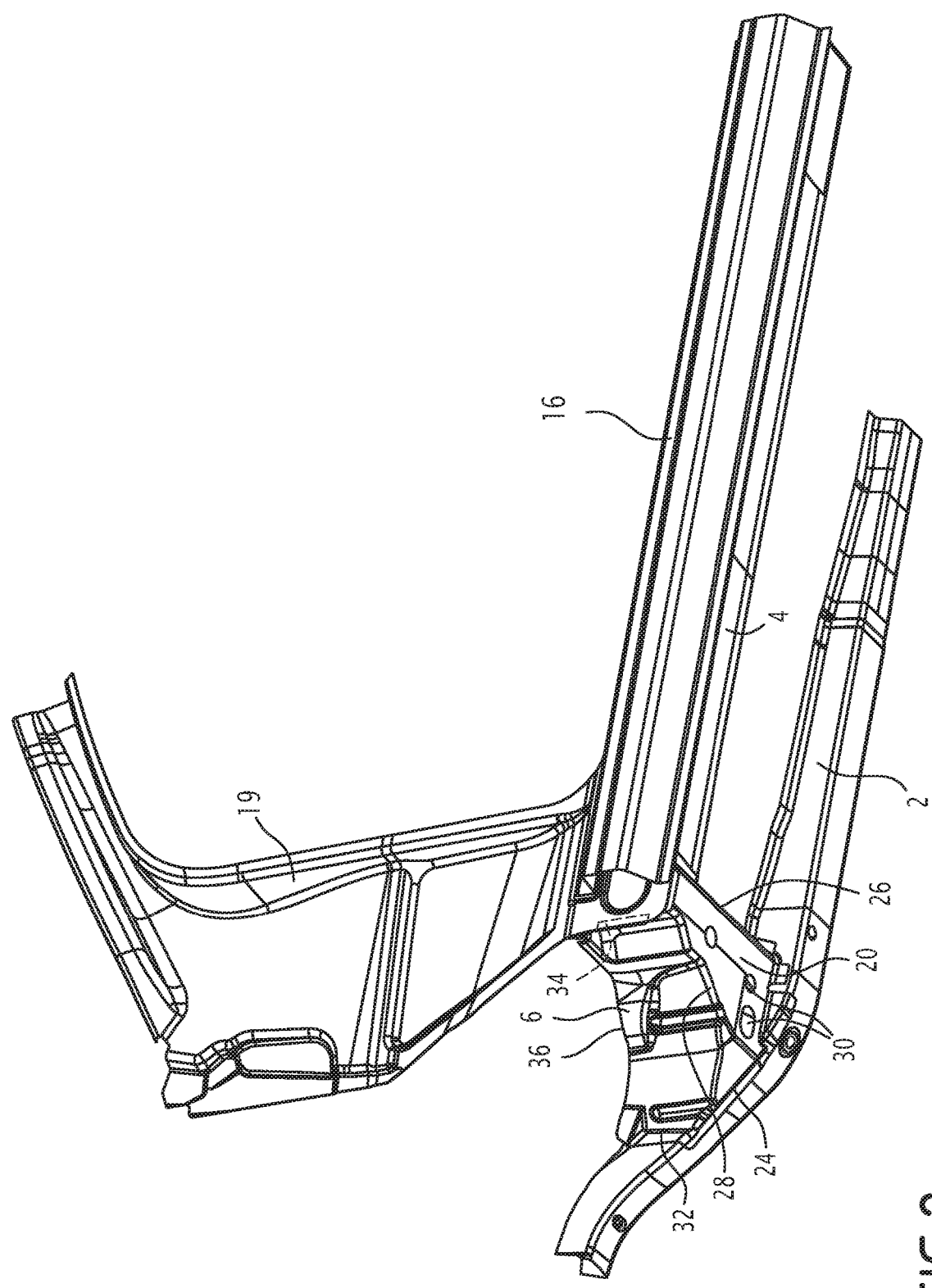
FIG. 2 is a perspective view of part of the vehicle underbody structure of FIG. 1.
Figure 3:
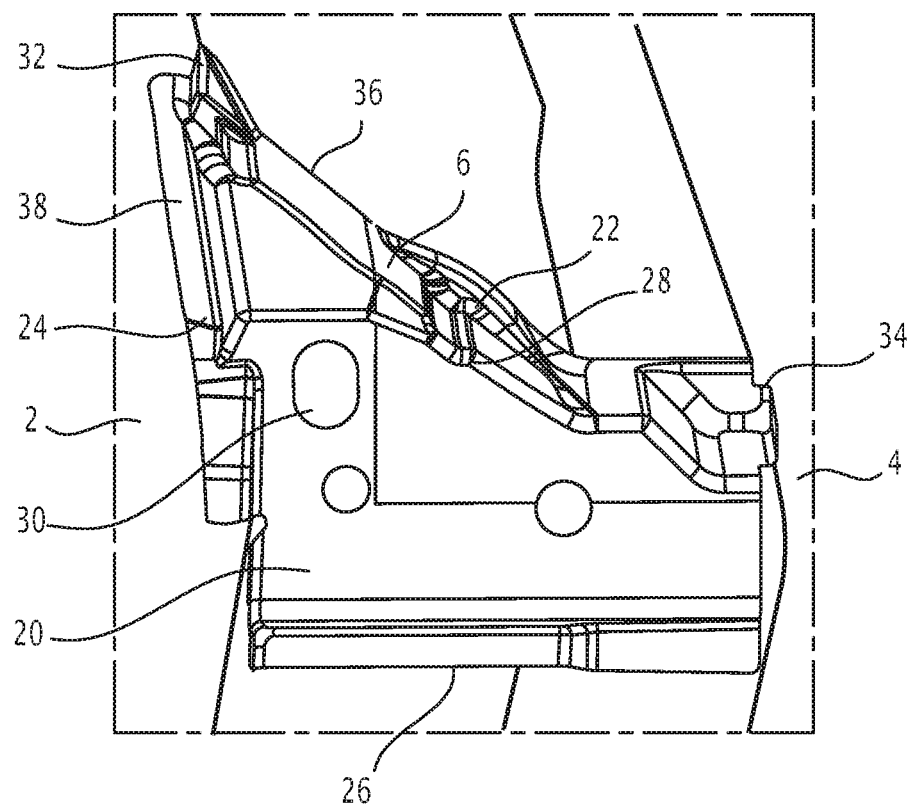
FIG. 3 is a perspective view of the reinforcement element of the vehicle underbody structure of FIG. 1.

The longitudinal beam 2 extends below the floor panel 1 in the vicinity of one of the side of the floor panel, near the left side 10 in the figures. The longitudinal beam 2 extends in the longitudinal direction substantially under the whole length of the floor panel 1, i.e. from the rear side to the front side, and comprises a longitudinal front end 12 extending past the front side 8 of the floor panel, as shown in FIG. 1. As known, the longitudinal beam 2 is part of the structure for protecting the passengers of the vehicle in case of a full frontal impact by being attached, at its front end 12 to the transversal bumper beam via impact absorbing elements, such as crash boxes. As shown in FIG. 2, the longitudinal beam has for example a U-shaped cross section in a transversal plane, the U opening towards the floor panel 1 of the vehicle.

The function of such a longitudinal beam is known per se and will not be described in detail here. The longitudinal beam 2 is for example made of a steel presenting a structure which is not fully martensitic, such as a dual-phase steel. In certain embodiments, the longitudinal beam is made of Dual Phase 600 or Dual Phase 980 as defined Euro norm HCT590X, HCT980X or HCT980XG respectively, these materials having satisfactory mechanical properties, such as yield strength and good energy absorption capacity due to their high strain hardenability, while allowing a reduction in the weight of the vehicle.

Figure 4:
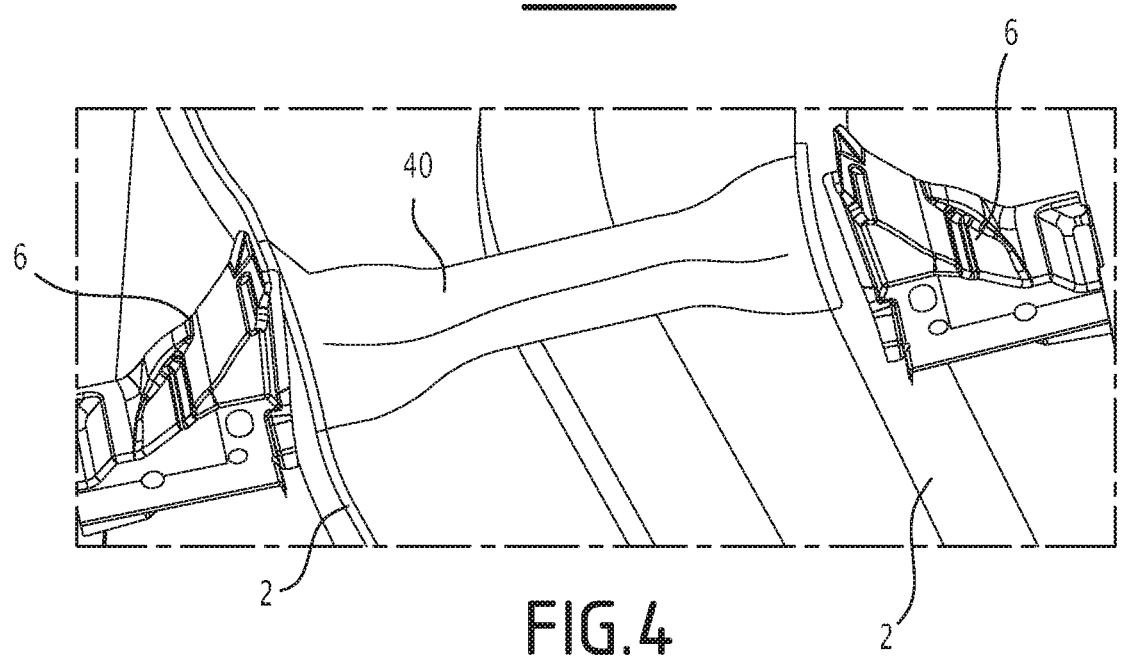
FIG. 4 is a larger perspective view of part of the vehicle underbody structure of the invention.

According to the embodiment shown in FIG. 4, the underbody structure comprises a left longitudinal beam 2 extending in the vicinity of and parallel to the left side 10 of the floor panel 1 and right longitudinal beam 2 extending in the vicinity of and parallel to the right side of the floor panel.

The lowerside sill part 4 extends in the longitudinal direction outboard of a side of the floor panel, i.e, along one side of the floor panel but outside of said floor panel 1. The lowerside sill part 4 is therefore substantially parallel to the longitudinal beam and adjacent to the floor panel 1. The lowerside sill part extends between a longitudinal rear end and a longitudinal front end 14. The rear end and the front end 14 are for example located substantially opposite or in the vicinity of the rear side and the front side of the floor panel in the transversal direction. The lowerside sill part 4 is for example made of a steel presenting a structure which is not fully martensitic, such as a dual-phase steel. In certain embodiments, the longitudinal beam is made of Dual Phase 600 or Dual Phase 980 as defined Euro norm HCT590X, HCT980X or HCT980XG respectively, these materials having satisfactory mechanical properties, such as yield strength and good energy absorption capacity due to their high strain hardenability, while allowing a reduction in the weight of the vehicle.

The lowerside sill part 4 is the inner part of the lowerside sill of the vehicle, which is, as known, the lower part of the door ring of the vehicle, which forms the frame arranged to receive one door of the vehicle. Consequently, the lowerside sill part 4 is assembled with an outer lowerside sill part 16 to form the lowerside sill. By inner and outer, it is meant that the lowerside sill part 4 extends towards the interior of the vehicle, while the outer lowerside sill part 16 is turned toward the outside of the vehicle. The outer lowerside sill part 16 is for example a press-hardened steel part having a tensile strength higher or equal to 1200 MPa. Such high mechanical characteristics make it a suitable part for forming a reinforcement structure such as the door ring.

The composition of such steel may comprise for example, in % weight: 0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration.

According another preferred embodiment, the steel composition comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the press hardened part is higher than 1800 MPa.

Such a steel has very high mechanical characteristics, which makes it a suitable part for forming a reinforcement structure such as the door ring.

The lowerside sill part 4 has for example a U-shaped cross-section in the transversal direction, as shown in FIG. 2, the U opening towards the outer lowerside sill part 16, i.e. towards the exterior of the vehicle. The outer lowerside sill part 16 is arranged to close this profile, as shown in FIG. 1. The lowerside sill part 4 and the outer lowerside sill part 16 are for example welded together to form the lowerside sill, as known per se. The function of such a lowerside sill is known per se and will not be described in detail here.

As shown in FIG. 1, a front pillar 18; which extends in the elevation direction from the front end 14 of the lowerside sill. As known, the front pillar 18 also forms a part of the door ring and serves as a support for the front part of the vehicle. The front pillar 18 is made of an inner front pillar part 19 (shown in FIG. 2) and of an outer front pillar part assembled together to form the front pillar. The front pillar is for example made of a press hardened steel part having a tensile strength higher or equal to 1200 MPa. Such high mechanical characteristics make it a suitable part for forming a reinforcement structure such as the door ring.

The composition of such steel may comprise for example, in % weight: 0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration.

According another preferred embodiment, the steel composition comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the press hardened part is higher than 1800 MPa. According to the embodiment shown in FIG. 4, the underbody structure comprises a left lowerside sill part 4 extending next and parallel to the left side 10 of the floor panel 1 and right lowerside sill part 4 extending next and parallel to the right side of the floor panel.

The longitudinal beam 2 and the lowerside sill part 4 are connected to each other by a reinforcement element 6 extending transversally between the longitudinal beam and the lowerside sill part 4.

More particularly, the reinforcement element 6 extends between the front end 14 of the lowerside sill part 4 and the part of the longitudinal beam 2 extending opposite the front end 14 in the transversal direction, as shown in FIG. 2.

The reinforcement element 6 comprises a first flank 20 extending substantially parallel to the floor panel 1 and a second flank 22 extending from the first flank 20 towards the floor panel. In other words, the first flank 20 extends in a plane containing a longitudinal direction and a transversal direction, i.e. a horizontal plane in regular use of the vehicle. The second flank 22 extends substantially perpendicularly to the first flank 20, each of the first and second flanks extending between the longitudinal beam 2 and the lowerside sill part 4.

The first flank has substantially a triangular shape, with a first side 24 extending along the longitudinal beam 2, a second side 26 extending transversally between the longitudinal beam 2 and the lowerside sill part 4 and a third side 28 joining the front end of the first side 24 to the second side 26 and extending between the longitudinal beam 2 and the lowerside sill part 4, the second flank 22 extending from said third side 28, meaning that the third side 28 of the first flank 20 is also a side of the second flank.

The second flank 22 extends substantially in a plane forming a non-zero angle with the longitudinal direction, meaning that the second flank is slanted between the longitudinal beam 2 and the lowerside sill part 4 such that the second flank 22 extends transversally as well as longitudinally. According to the embodiment shown in the figures, the second flank 22 does not extend in a single plane and can be slightly arcuate between the longitudinal beam 2 and the lowerside sill part 4.

Moreover, the second flank 22 is not planar and comprises stamped ribs. These ribs ensure the requested stiffness along the elevation direction of the reinforcement element 6.

The second flank 22 extends between a first side 32 extending from the front end of the first side 24 of the first flank and a second side 34 extending from the end of the second side 26 of the first flank in contact with the lowerside sill part 4. The third side 28 of the first flank 20 joins the first side 32 and the second side 34 of the second flank 22 and forms the lower side of the second flank. The second flank 22 extends between the lower side and an upper side 36, opposite the lower side, also extending between the first side 32 and the second side 34 of the second flank.

The first and second flanks 20 and 22 each comprise assembling edges 38 arranged to be applied against the longitudinal beam 2 and the lowerside sill part 4 to form assembling surfaces with these parts as will be described subsequently.

According to the embodiment shown in the figures, the first flank 20 comprises fixing holes 32 for assembling the reinforcement element 6 to the cradle of the vehicle.

The reinforcement element 6 is made of a press hardened steel part having a tensile strength higher or equal to 1200 MPa. The material presents a martensitic microstructure.

The composition of the press hardened steel may comprise for example, in % weight: 0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration.

According another preferred embodiment, the steel composition comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the press hardened part is higher than 1800 MPa. The steel may be coated, for example galvannealed or galvanized by any suitable process such as hot dip coating, electrodeposition, vacuum coating.

By martensitic microstructure, it is meant that the structure of the steel consists in more than 95% of martensite after hot stamping. The reinforcement element 6 is made from a planar blank which is hot stamped to form the first and second flanks 20 and 22 in a single operation.

The obtained reinforcement element 6 has a very high tensile strength which makes it particularly robust against deformation.

The above-described reinforcement element 6 is attached to the longitudinal beam 2 by one of its transversal ends, formed by the first side 24 of the first flank 20 and by the first side 32 of the second flank 22, and to the lowerside sill part 4 by the other of its transversal ends, formed the end of the second side 26 of the first flank 20 and by the second side 34 of the second flank 22. According to the embodiment shown in FIG. 2, a part of the inner front pillar part 19 is also attached to the second side 34 and extends between the reinforcement element and the outer lowerside sill part 16. The junction between the lowerside sill, the front pillar 18 and the reinforcement element 6 is therefore particularly robust.

The transversal ends of the reinforcement element 6 are attached to the longitudinal beam 2 and to the lowerside sill part 4 by welding. This welding can be performed by resistance spot welding, arc welding or laser welding the assembling edges 38 of the reinforcement element 6 to the longitudinal beam 2 and to the lowerside sill part 4.

According to the embodiment shown in FIG. 4, the underside body structure comprises a left reinforcement element 6 joining the left longitudinal beam 2 to the left lowerside sill part 4 and a right reinforcement element 6 joining the right longitudinal beam 2 to the right lowerside sill part 4.

According to this embodiment, a transversal beam 40 extending between the left longitudinal beam 2 and the right longitudinal beam 2. The transversal beam 40 extends along the same transversal axis as the left and right reinforcement elements 6, meaning that the transversal ends of the transversal beam 40 extend opposite the transversal ends of the left and right reinforcement elements 6 attached to the left and right longitudinal beam 2. The transversal beam 40 is for example made of a press hardened steel part having a tensile strength higher or equal to 1200 MPa.

The composition of such steel may comprise for example, in % weight: 0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration.

According another preferred embodiment, the steel composition comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, the remainder being iron and unavoidable impurities resulting from the elaboration. With this composition range, the tensile strength of the press hardened part is higher than 1800 MPa.

In normal use of the vehicle, the reinforcement element(s) have an anti-torsion function to maintain the transversal and longitudinal orientation of the lowerside sill relative to the longitudinal beam 2 and to maintain the cohesion of the underside body structure. For this function, the reinforcement element 6 can also be referred to as a torsion box.

The function of the reinforcement element(s) 6 in case of a small overlap crash will now be described in reference to FIGS. 5 to 8.

Figure 5:
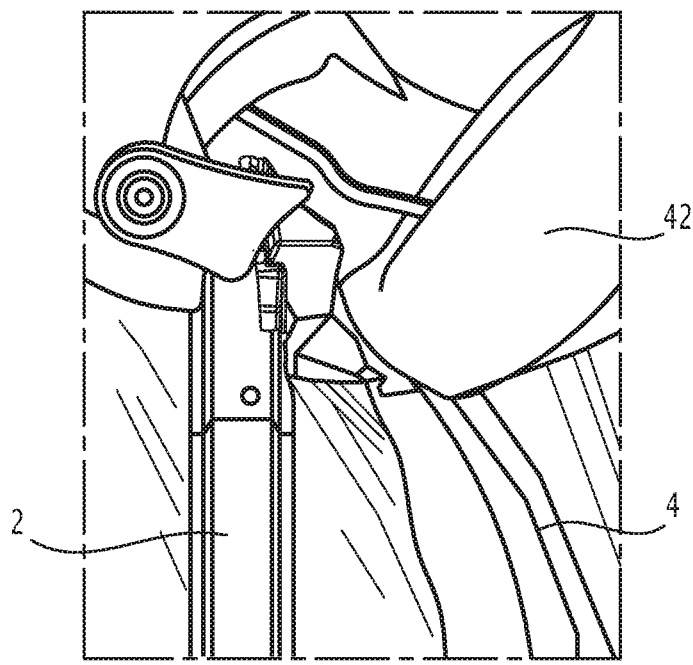
FIGS. 5 and 6 are respectively views from below and from above of part of a conventional vehicle underbody structure after a small overlap crash.
Figure 6:
Figure 7:
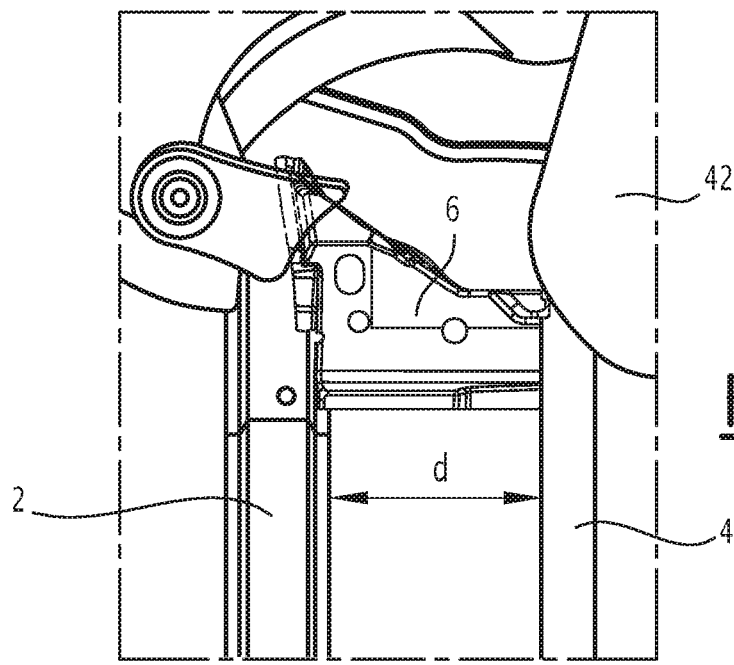
FIGS. 7 and 8 are respectively views from below and from above of part of vehicle underbody structure of the invention after a small overlap crash.
Figure 8:
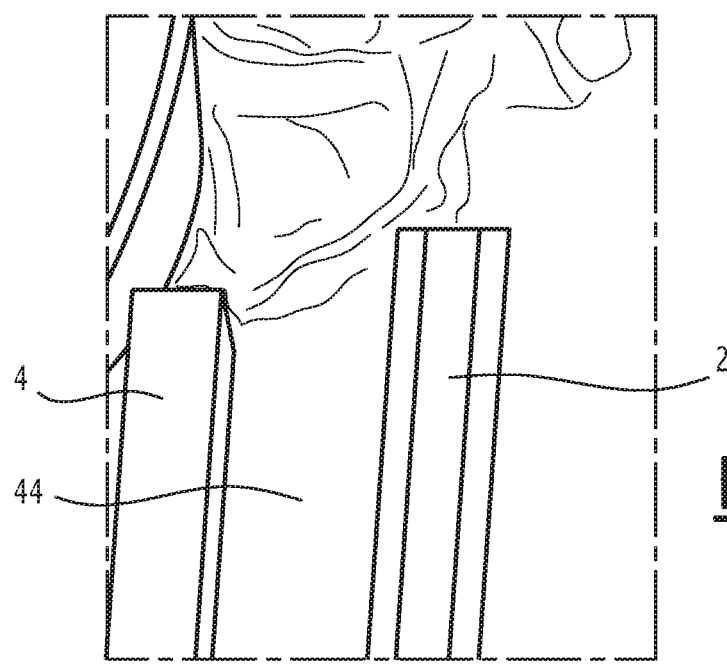

FIGS. 5 and 6 show respectively from below and from above a conventional vehicle underbody structure after a small overlap crash and FIGS. 7 and 8 show, respectively from below and from above, a vehicle underbody structure according to the invention after a small overlap crash.

In case of a small overlap crash, the wheel 42 of the vehicle extending in front of the front pillar 18 tends to rotate towards the rear and the interior of the vehicle.

As can be seen by comparing FIG. 5 and FIG. 7, the invention makes it possible to strongly limit the intrusions in the passenger compartment. Indeed, in the case of a conventional underbody structure, the rotation of the wheel 42 crushes the lowerside sill part in the transversal direction and enters the vehicle compartment. In this case, as shown in FIG. 6, the space 44 for receiving the feet of the passenger is also crushed between the lowerside sill and the longitudinal beam 2, which can badly injure the passenger.

With the underbody structure of the invention, the reinforcement element 6 prevents the lowerside sill to enter into the vehicle compartment and thus strongly reduces the crushing of the space 44 for receiving the feet of the passenger.

Consequently, the distance d separating in the transversal direction the longitudinal beam 2 from the lowerside sill 4 is maintained or reduced by a small amount. Consequently, the space 44 for receiving the feet of the passenger keeps its integrity after the crash and the passenger is protected.

As an example, the distance d separating in the transversal direction the front end of the lowerside sill and the longitudinal beam 2 is substantially around 290 mm in normal state of the vehicle. In case of a small overlap crash, this distance is reduced to around 160 mm in a conventional underbody structure while said distance is reduced from 1 or 2 mm, i.e. to around 288 mm, with the underbody structure of the invention.

Consequently, the use of the reinforcement element 6 according to the invention greatly improves the behavior of the vehicle in the case of a small overlap impact.

What is claimed is:

1. A vehicle underbody structure, comprising
a floor panel,
at least one longitudinal beam extending in a longitudinal direction of the vehicle under said floor panel and
at least one lowerside sill part extending in the longitudinal direction adjacent to the floor panel,
the vehicle underbody structure further comprising at least one reinforcement element extending in a transversal direction, substantially perpendicular to the longitudinal direction, said reinforcement element extending under the floor panel and being attached at one of its transversal ends to said longitudinal beam and at the other of its transversal ends to said lowerside sill part, wherein:
said reinforcement element is made of a press-hardened steel part having a tensile strength higher or equal to 1200 MPa, and
said reinforcement element comprises a first flank extending in a plane substantially parallel to the floor panel and a second flank extending in a plane perpendicular to the first flank, said first and second flanks both joining said longitudinal beam to said lowerside sill part, the second flank extending in a plane forming a non-zero angle with the longitudinal direction,
wherein the first flank has a substantially triangular shape, a first side of said triangular shape extending along said longitudinal beam, a second side of said triangle shape joining said longitudinal beam to the said lowerside sill part, and a third side of said triangular shape extending along the second flank.

2. The vehicle underbody structure according to claim 1, wherein said reinforcement element has a martensitic microstructure, and wherein either said longitudinal beam or said lowerside sill part has a structure which is not fully martensitic.

3. The vehicle underbody structure according to claim 2, wherein both said longitudinal beam and said lowerside sill part have structures which are not fully martensitic.

4. The vehicle underbody structure according to claim 1, wherein said reinforcement element is attached to said lowerside sill part at a front longitudinal end of said lowerside sill part.

5. The vehicle underbody structure according to claim 1, wherein said reinforcement element is welded to said longitudinal beam and to said lowerside sill part.

6. The vehicle underbody structure according to claim 5, wherein the welding of said reinforcement element to said one longitudinal beam and to said lowerside sill part is a resistance spot welding or an arc welding or a laser welding.

7. The vehicle underbody structure according to claim 1, wherein the composition of the press-hardened steel comprises in % weight:
$0.15\% \leq C \leq 0.5\%$,
$0.5\% \leq Mn \leq 3\%$,
$0.1\% \leq Si \leq 1\%$,
$0.005\% \leq Cr \leq 1\%$,
$Ti \leq 0.2\%$,
$Al \leq 0.1\%$,
$S \leq 0.05\%$,
$P \leq 0.1\%$,
$B \leq 0.010\%$, the remainder being iron and unavoidable impurities resulting from the elaboration, or
$0.20\% \leq C \leq 0.25\%$,
$1.1\% \leq Mn \leq 1.4\%$,
$0.15\% \leq Si \leq 0.35\%$,
$\leq Cr \leq 0.30\%$,
$0.020\% \leq Ti \leq 0.060\%$,
$0.020\% \leq Al \leq 0.060\%$,
$S \leq 0.005\%$,
$P \leq 0.025\%$,
$0.002\% \leq B \leq 0.004\%$, the remainder being iron and unavoidable impurities resulting from the elaboration; or
$0.24\% \leq C \leq 0.38\%$,
$0.40\% \leq Mn \leq 3\%$,
$0.10\% \leq Si \leq 0.70\%$,
$0.015\% \leq Al \leq 0.070\%$,
$Cr \leq 2\%$,
$0.25\% \leq Ni \leq 2\%$,
$0.015\% \leq Ti \leq 0.10\%$,
$Nb \leq 0.060\%$,
$0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration.

8. The vehicle underbody structure according to claim 1, wherein the press hardened steel part is coated.

9. The vehicle underbody structure according to claim 1, further comprising a front pillar attached to said lowerside sill part and extending in an elevation direction substantially perpendicular to the longitudinal and transversal directions, said front pillar extending from a longitudinal front end of said lowerside sill part.

10. The vehicle underbody structure according to claim 1, wherein
the at least one longitudinal beam includes a left longitudinal beam and a right longitudinal beam, both extending in the longitudinal direction under said floor panel, and
the at least one lowerside sill includes a left lowerside sill part and a right lowerside sill part, extending in the longitudinal direction on either side of the floor panel,
the at least one reinforcement element includes a left reinforcement element extending between the left longitudinal beam and the left lowerside sill part, and
a right reinforcement element extending between the right longitudinal beam and the right lowerside sill part,
said left and right reinforcement elements being made of a press hardened steel part having a tensile strength higher or equal to 1200 MPa.

11. The vehicle underbody structure according to claim 10, further comprising a transversal beam extending between the left longitudinal beam and the right longitudinal beam, said transversal beam extending along the same transversal axis as the left and right reinforcement elements;

said transversal beam being made of a press hardened steel part having a tensile strength higher or equal to 1200 MPa.

12. A vehicle body comprising a vehicle underbody structure according to claim 1.

* * * * *